United States Patent
Maruyama et al.

(10) Patent No.: US 6,857,025 B1
(45) Date of Patent: Feb. 15, 2005

(54) HIGHLY SCALABLE SYSTEM AND METHOD OF REGULATING INTERNET TRAFFIC TO SERVER FARM TO SUPPORT (MIN,MAX) BANDWIDTH USAGE-BASED SERVICE LEVEL AGREEMENTS

(75) Inventors: Kiyoshi Maruyama, Chappaqua, NY (US); German Goldszmidt, Dobbs Ferry, NY (US); Jean Lorrain, Vence (FR); Karen Appleby-Hougham, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/543,207

(22) Filed: Apr. 5, 2000

(51) Int. Cl.[7] ............................................. G06F 15/16
(52) U.S. Cl. ........................ 709/235; 709/224; 709/234
(58) Field of Search ............................... 709/224, 235, 709/234

(56) References Cited

U.S. PATENT DOCUMENTS 6,006,264 A * 12/1999 Colby et al. ................ 709/226
6,119,235 A *  9/2000 Vaid et al. .................. 713/201
6,502,131 B1 * 12/2002 Vaid et al. .................. 709/224

* cited by examiner

Primary Examiner—Le Hien Luu
Assistant Examiner—Adnan M Mirza
(74) Attorney, Agent, or Firm—Wan Yee Cheung; Gary M. Hartman; Domenica N. S. Hartman (57) ABSTRACT

A highly scalable system and method for supporting (mim, max) based Service Level Agreements (SLA) on outbound bandwidth usage for a plurality of customers whose applications (e.g.,Web sites) are hosted by a server farm that consists of a very large number of servers. The system employs a feedback system that enforces the outbound link bandwidth SLAs by regulating the inbound traffic to a server or server farm. Inbound traffic is admitted to servers using a rate denoted as $Rt(i,j)$, which is the amount of the $i^{th}$ customer's $j^{th}$ type of traffic that can be admitted within a service cycle time to servers which support the $i^{th}$ customer. A centralized device computes $Rt(i,j)$ based on the history of admitted inbound traffic to servers, the history of generated outbound traffic from servers, and the SLAs of various customers. The $Rt(i,j)$ value is then relayed to one or more inbound traffic limiters that regulate the inbound traffic using the rates $Rt(i,j)$ in a given service cycle time. The process of computing and deploying $Rt(i,j)$ values is repeated periodically. In this manner, the system provides a method by which differentiated services can be provided to various types of traffic, the generation of output from a server or a server farm is avoided if that output cannot be delivered to end users, and revenue can be maximized when allocating bandwidth beyond the minimums.

33 Claims, 8 Drawing Sheets

STEP 1 ⎡ START:
FOR ALL (i,j), SET Bmax(i,j) = MIN (Bbound(i,j),    /* REFLECTING "EXTERNAL CONSTRAINT" Bbound(i,j) */
          Rbound(i,j)*b(i,j);
FOR ALL (i,j), SET Bt(i,j) = b(i,j)*Ra(i,j);        /* ESTIMATING THE CURRENT OUTBOUND TRAFFIC */
LET Bt BE THE SUM OF Bt(i,j) OVER ALL (i,j);        /* ESTIMATING THE CURRENT TOTAL
IF Bt>Btotal THEN GO TO STEP 2;                                      OUTBOUND TRAFFIC */
IF ((Rr(i,j)=0                                      /* LINK CONGESTION DETECTED */
    & Bt(i,j)<Bmax(i,j))) OVER ALL (i,j)            /* NO REQUEST REJECTION */
    THEN GO TO STEP 5;  ELSE GO TO STEP 2;          /* SLA IS NOT VIOLATED."<="
                                                       MEANS LESS-THAN-OR-EQUAL-TO */

STEP 2 ⎡ COMPUTE_BANDWIDTH_TARGETS:                 /* COMPUTING NEW TARGETS FOR BANDWIDTH USAGE */
FOR ALL (i,j), SET Bt(i,j) =b(i,j)*Ra(i,j)+Rr(i,j); /* ESTIMATING OUTBOUND TRAFFIC WHEN ALL REQUESTS
LET Bt BE THE SUM OF Bt(i,j) FOR ALL (i,j);                             ARE ADMITTED */
FOR EVERY (i,j) SUCH THAT Bt(i,j)>Bmax(i,j)         /* THIS STEP IS NEEDED SINCE Bt(i,j) WERE JUST
    FIRST SET Bt = Bt−Bt(Bt(i,j)−Bmax(i,j))                             RE−COMPUTED */
    AND THEN SET Bt(i,j) =Bmax(i,j);                /* WANTS TO GENERATE MORE THAN THE MAXIMUM SLA */
IF Bt <= Btotal                                     /* ADJUST EXPECTED TOTAL OUTBOUND TRAFFIC */
    THEN GO TO STEP1; ELSE GO TO STEP 3;            /* BOUNDING TRAFFIC BY MAXIMUM SLA */
                                                    /* NO LINK CONGESTION WILL BE ANTICIPATED */

HIGHLY SCALABLE SYSTEM AND METHOD OF REGULATING INTERNET TRAFFIC TO SERVER FARM TO SUPPORT (MIN,MAX) BANDWIDTH USAGE-BASED SERVICE LEVEL AGREEMENTS

BACKGROUND OF THE INVENTION

1. Field of the Invention

The present invention generally relates to the global Internet and Internet World Wide Web (WWW) sites of various owners that are hosted by a service provider using a group of servers that are intended to meet established service levels. More particularly, this invention relates to a highly scalable system and method for supporting (min,max) based service level agreements on outbound bandwidth usage for a plurality of customers by regulating inbound traffic coming to a server farm where the server farm is comprised of numerous servers.

2. Description of the Prior Art

The Internet is the world's largest network and has become essential to businesses as well as to consumers. Many businesses have started outsourcing their e-business and e-commerce Web sites to service providers instead of running their Web sites on their own server(s) and managing them by themselves. Such a service provider needs to install a collection of servers (called a Web Server Farm (WSF) or a Universal Server Farm (USF)), which can be used by many different businesses to support their e-commerce and e-business. These business customers (the service provider's "customers") have different "capacity" requirements for their Web sites. Web Server Farms are connected to the Internet via high speed communications links such as T3 and OCx links. These links are shared by all of the Web sites and all of the users accessing the services hosted by the Web Server Farm. When businesses (hereafter referred to as customers of a server farm, or customers) outsource their e-commerce and/or e-business to a service provider, they typically need some assurance as to the services they are getting from the service provider for their sites. Once the service provider has made a commitment to a customer to provide a certain level of service (called a Service Level Agreement (SLA)), the provider needs to maintain that level of service to that customer.

A general SLA on communications link bandwidth usage for a customer can be denoted by a pair of bandwidth constraints: the minimum guaranteed bandwidth, $Bmin(i,j)$, and the maximum bandwidth bound, $Bmax(i,j)$, for each $i^{th}$ customer's $j^{th}$ type or class traffic. The minimum (or min) bandwidth $Bmin(i,j)$ is a guaranteed bandwidth that the $i^{th}$ customer's $j^{th}$ type traffic will receive regardless of the bandwidth usage by other customers. The maximum (or max) bandwidth $Bmax(i,j)$ is an upper bound on the bandwidth that the $i^{th}$ customer's $j^{th}$ type traffic may receive provided that some unused bandwidth is available. Therefore, the range between $Bmin(i,j)$ and $Bmax(i,j)$ represents the bandwidth provided on an "available" or "best-effort" basis, and it is not necessarily guaranteed that the customer will obtain this bandwidth. In general, the unit cost to use the bandwidth up to $Bmin(i,j)$ is less than or equal to the unit cost to use the bandwidth between $Bmin(i,j)$ and $Bmax(i,j)$. Such a unit cost assigned to one customer may differ from those assigned to other customers.

In the environment of Web site hosting, where communications link(s) between the Internet and a server farm is shared by a number of customers (i.e., traffic to and from customer Web sites share the communications link(s)), the bandwidth management on the outbound link, i.e., the link from a server farm to the Internet, is more important than the bandwidth management on the inbound link since the amount of traffic on the outbound link is many magnitudes greater than that on the inbound link. Furthermore, in most cases, the inbound traffic to the server farm is directly responsible for the outbound traffic generated by the server farm. Therefore, the constraints $Bmin(i,j)$ and $Bmax(i,j))$ imposed by a service level agreement are typically applied to the outbound link bandwidth usage.

There are two types of bandwidth control systems that have been proposed either in the market or in the literature. One type is exemplified by the Access Point (AP) products from Lucent/Xedia (www.xedia.com) or by the Speed-Class products from PhaseCom (www.speed-demon.com). These products are self-contained units and they can be applied to regulate the outbound traffic by dropping some outbound packets to meet with the (minimum,maximum) bandwidth SLA for each customer. The other type of bandwidth control system is exemplified by U.S. Patent Application Ser. No. 09/506,603commonly C assigned with the present invention. This system, referred to as Communications Bandwidth Management (CBM), operates to keep the generated outbound traffic within the SLAs by regulating the inbound traffic that is admitted to a server farm. As with the first type of bandwidth control system exemplified by AP and Speed-Class products, each CBM is a self-contained unit.

Bandwidth control systems of the types exemplified by Lucent AP noted above can be applied to enforce SLAs on the outbound link usage by each customer (and on each customer traffic type). Some of these systems are limited to supporting the minimum bandwidth SLA while others are able to support the (minimum,maximum) bandwidth SLA. A disadvantage with systems that enforce the outbound bandwidth SLA by dropping packets already generated by the server farm is that they induce undesirable performance instability. That is, when some outbound packets must be dropped, each system drops packets randomly, thus leading to frequent TCP (Transmission Control Protocol) retransmission, then to further congestion and packet dropping and eventually to thrashing and slowdown. The CBM system noted above solves such a performance instability problem by not admitting inbound traffic whose output cannot be delivered due to exceeding the SLA. The major problem of AP and CBM units is that their scalability is limited. A large server farm requires more than one unit of AP or CBM unit. However, because each of these units is self-contained and standalone, they cannot collaborate to handle the amount of traffic beyond the capacity of a single unit. When a multiple number ("n") of AP or CBM systems are needed to be deployed to meet the capacity requirement, each unit will handle (1/n)-th of the total bandwidth or traffic, and therefore the sharing of the available bandwidth and borrowing of unused bandwidth among customers becomes impossible.

From the above, it can be seen that it would be desirable if a system for bandwidth control of a server farm were available that overcomes the scalability problem while eliminating the performance and bandwidth sharing shortcomings of the prior art.

SUMMARY OF THE INVENTION

The present invention provides a highly scalable system and method for guaranteeing and delivering (minimum, maximum) based communications link bandwidth SLAs to customers whose applications (e.g., Web sites) are hosted by a server farm that consists of a very large number of servers, e.g., hundreds of thousands of servers. The system of this invention prevents any single customer (or class of) traffic from "hogging" the entire bandwidth resource and penalizing others. The system accomplishes this in part through a feedback system that enforces the outbound link bandwidth SLAs by regulating the inbound traffic to a server farm. In this manner, the system of this invention provides a method by which differentiated services can be provided to various types of traffic, the generation of output from a server farm is avoided if that output cannot be delivered to end users, and any given objective function is optimized when allocating bandwidth beyond the minimums. The system accomplishes its high scalability by allowing the deployment of more than one very simple inbound traffic limiter (or regulator) that performs the rate-based traffic admittance and by using a centralized rate scheduling algorithm. The system also provides means for any external system or operator to further limit the rates used by inbound traffic limiters.

According to industry practice, customers may have an SLA for each type or class of traffic, whereby (minimum, maximum) bandwidth bounds are imposed in which the minimum bandwidth represents the guaranteed bandwidth while the maximum bandwidth represents the upper bound to the as-available use bandwidth. The bandwidth control and management system of this invention enforces the outbound link bandwidth SLAs by regulating (thus limiting when needed) the various customers' inbound traffic to the server farm. Incoming traffic (e.g., Internet Protocol (IP) packets) can be classified into various classes/types (denoted by (i,j)) by Ad examining the packet destination address and the TCP port number. For each class (i,j), there is a "target" rate denoted as $Rt(i,j)$, which is the amount of the $i^{th}$ customer's $j^{th}$ type traffic that can be admitted within a given service cycle time to the server farm which supports the $i^{th}$ customer (this mechanism is known as the rate-based admittance). A centralized device is provided that computes $Rt(i,j)$ using the history of admitted inbound traffic to the server farm, the history of rejected (or dropped) inbound traffic, the history of generated outbound traffic from the server farm, and the SLAs. Each dispatcher can use any suitable algorithm to balance the work load to servers when dispatching traffic to servers. Once $Rt(i,j)$ values have been computed by the centralized device, the centralized device relays the $Rt(i,j)$ values to the one or more elements (called inbound traffic limiters) that regulate the inbound traffic using the rates $Rt(i,j)$ in a given service cycle time. The above process of computing and deploying $Rt(i,j)$ values is repeated periodically. This period can be as often as the service cycle time.

In addition to enforcing the outbound link bandwidth SLAs in a highly scalable fashion, other preferred feature of the present invention is the ability to control the computation of $Rt(i,j)$ via an external means such as an operator and any server resource manager. Yet other preferred features of the present invention are the ability to distribute monitoring and traffic limiting functions even to each individual server level. Any existing workload dispatching product(s) can be used with this invention to create a large capacity dispatching network. Yet other preferred features of the present invention are the capabilities to regulate inbound traffic to alleviate the congestion (and thus performance) of other server farm resources (in addition to the outbound link bandwidth) such as web servers, data base and transaction servers, and the server farm intra-infrastructure. These are achieved by providing "bounds" to the centralized device.

Other objects and advantages of this invention will be better appreciated from the following detailed description.

DETAILED DESCRIPTION OF THE PREFERRED EMBODIMENT

Figure 1:
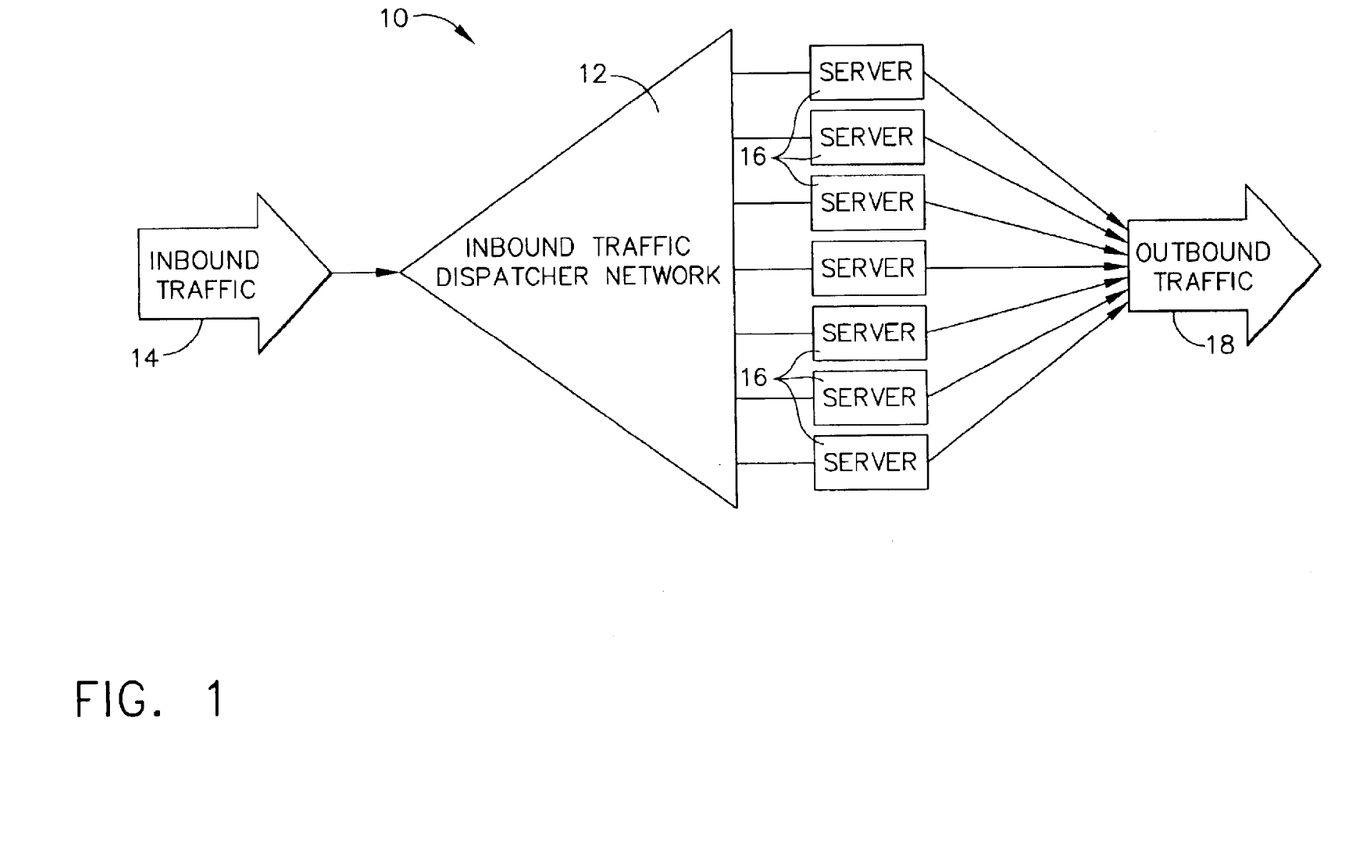
FIG. 1 represents a system environment in which Internet server farm traffic is to be controlled and managed with a bandwidth control system in accordance with the present invention.

FIG. 1 schematically represents a system environment in which traffic through an Internet server farm 10 can be regulated with a bandwidth control system in accordance with the present invention. The Internet server farm 10 is represented as being comprised of an inbound traffic (or TCP connection request) dispatching network 12 that dispatches inbound traffic 14 to appropriate servers 16. The invention is intended for use with a very large number of servers 16 (the size beyond the capacity of a single dispatcher unit) of potentially different capacities that create the outbound traffic 18 of the server farm 10. An objective of this invention is to provide a highly scalable system and method that manages the outbound bandwidth usage of various customers (and thus customer traffic) subject to (min,max) bandwidth-based service level agreements (SLAs) by regulating the inbound traffic 14 of various customers. Table 1 contains a summary of symbols and notations used throughout the following discussion.

TABLE 1

| | |
|---|---|
| i | The $i^{th}$ customer. |
| j | The $j^{th}$ traffic type/class. |
| k | The $k^{th}$ server. |
| Ra(i,j,k) | Inbound traffic of the $j^{th}$ type of the $i^{th}$ customer that has been admitted at the $k^{th}$ server. |
| Ra(i,j) | The total inbound traffic of the $j^{th}$ type of the $i^{th}$ customer that has been admitted; equivalent to the sum of Ra(i,j,k) over all k. |
| Rr(i,j,k) | Inbound traffic of the $j^{th}$ type of the $j^{th}$ customer that has been rejected at the $k^{th}$ server. |
| Rr(ij) | The total inbound traffic of the $j^{th}$ type of the $j^{th}$ customer that has been rejected; equivalent to the sum of Rp(i,j,k) over all k. |
| Rt(i,j,k) | The allowable (target) traffic rate for the $j^{th}$ customer's $j^{th}$ type traffic at the $k^{th}$ server. |
| Rt(i,j) | The total allowable traffic rate for the $j^{th}$ customer's $j^{th}$ type traffic, equivalent to the sum of Rt(i,j,k) over all k. |
| B(i,j,k) | The $i^{th}$ customer's $j^{th}$ type outbound traffic from the $k^{th}$ server. |
| B(i,j) | The total of the $i^{th}$ customer's $j^{th}$ type outbound traffic, equivalent to the sum of B(i,j,k) over all k. |

TABLE 1-continued

| | |
|---|---|
| b(i,j) | The expected bandwidth usage by a unit of inbound traffic type (i,j). |
| C(i,j,k) | The server resource (processing capacity) that is allocated to the $i^{th}$ customer's $j^{th}$ type traffic at the $k^{th}$ server. |
| C(i,j) | The total processing capacity that is allocated to the $i^{th}$ customer's $j^{th}$ type traffic, equivalent to the sum of C(i,j,k) over all k. |
| c(i,j) | The expected server resource usage by a unit of (i,j) traffic. |
| Bmin(i,j) | The guaranteed outbound bandwidth usage on the $i^{th}$ customer's $j^{th}$ type traffic. |
| Bmax(i,j) | The maximum on the outbound bandwidth usage on the $j^{th}$ customer's $j^{th}$ type traffic. |
| Btotal | The total usable bandwidth available for allocation. |
| Rbound(i,j) | An optional bound on Rt(i,j) that may be set manually or by any other resource manager of a server farm. |

Figure 2:
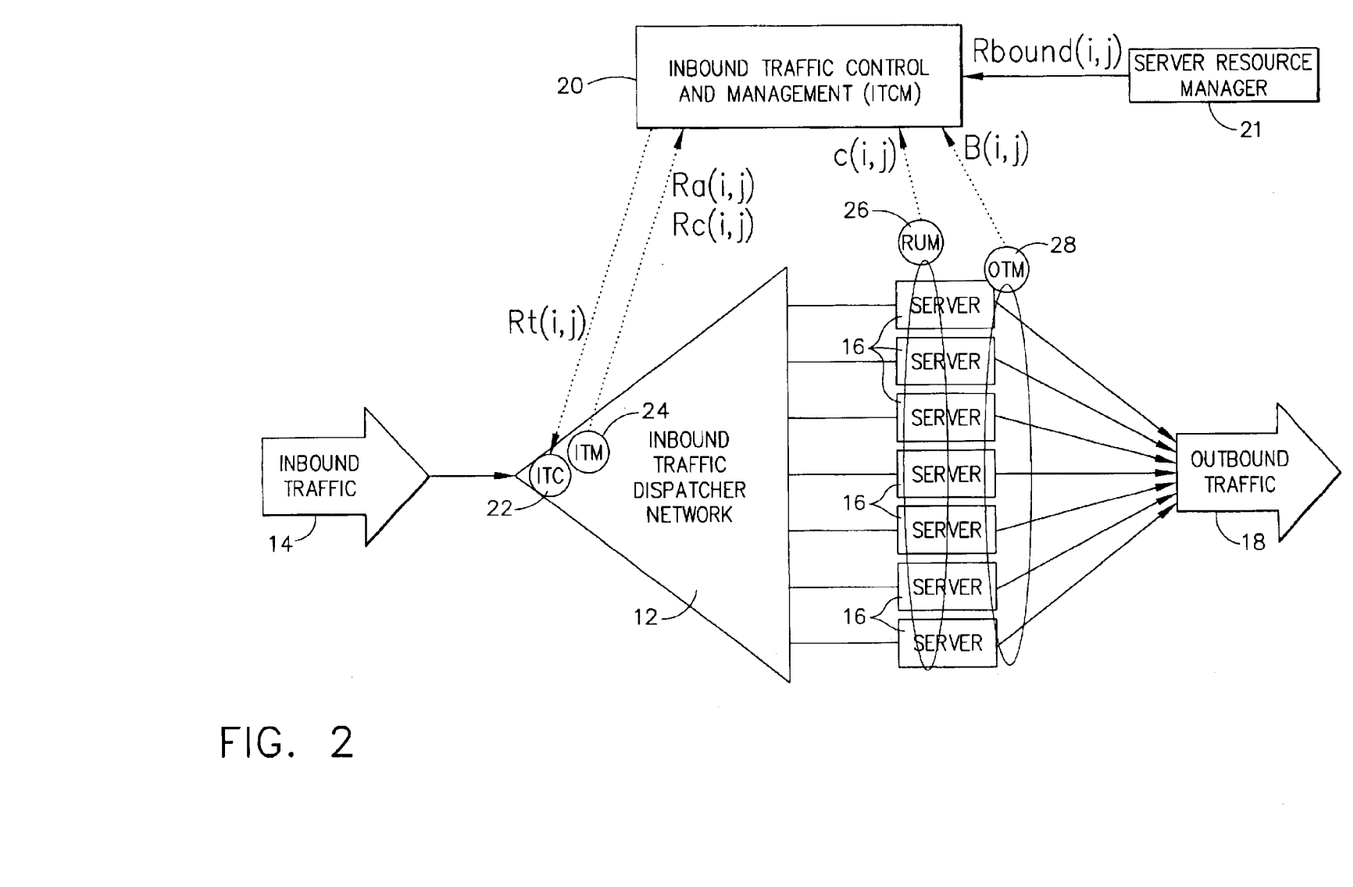
FIG. 2 schematically represents a bandwidth control system operating within the system environment of FIG. 1 in accordance with the present invention.

FIG. 2 schematically illustrates an embodiment of the invention operating within the system environment shown in FIG. 1. A unit referred to herein as the inbound traffic scheduler (ITS) unit 20 is employed to observe the amount of incoming traffic 14 that consists of the amount of admitted inbound traffic and the amount of rejected traffic. The inbound traffic dispatching network 12 monitors both admitted and rejected traffic amount. The ITS unit 20 also observes outbound traffic 18. The ITS unit 20 then computes the expected amount of outbound traffic that would be generated when one unit of traffic is admitted to a server 16, computes the inbound traffic target rates, and informs the rates to an inbound traffic limiter (ITL) 22. The ITL 22 then regulates the arriving inbound traffic 14 by imposing target rates at which inbound traffic 14 is admitted. Each of these functions is performed for the $i^{th}$ customer's $j^{th}$ class traffic within a service cycle time, which is a unit of time or period that is repeated. Optionally observed by the ITS unit 20 is the average resource usage c(i,j) by a unit of type (i,j) inbound traffic 14.

As indicated in Table 1, Ra(i,j) denotes the amount of inbound traffic 14 admitted and Rr(i,j) denotes the amount of inbound traffic 14 rejected. Both are obtained by the ITS unit 20 during a service cycle time (thus representing a rate) for the $i^{th}$ customer's $j^{th}$ class traffic. Rr(i,j) greater than zero implies that the Rr(i,j) amount of traffic was rejected due to inbound traffic 14 exceeding the usage of the agreed upon outbound bandwidth. Rt(i,j) denotes the allowable (thus targeted) portion of inbound traffic 14 within a service cycle time for the ith customer's $j^h$ class traffic. Here, Ra(i,j) is smaller thin or equal to Rt(i,j) as a result of the operation of the ITL 22. B(i,j) denotes the total amount of outbound traffic 18 generated for the $i^{th}$ customer's $j^{th}$ class traffic within a service cycle time, and c(i,j) denotes the average resource usage by a unit of type (i,j) inbound traffic 14. An example of c(i,j) is the CPU cycles required to process one (i,j) type request. Finally, Rbound(i,j) denotes the absolute bound on Rt(i,j) when the ITS 20 computes new Rt(i,j).

In accordance with the above, the following operations will be completed during a service cycle time:

(a) The ITS unit 20 collects Ra(i,j), Rr(i,j), B(i,j) and optionally c(i,j), and computes b(i,j), the expected amount of output that would be generated when one unit of traffic type (i,j) is processed by a server 16. The ITS unit 20 also collects Rbound(i,j) when available.

(b) The ITS unit 20 runs a rate scheduling (or freight load scheduling) algorithm to determine the best target values for Rt(i,j). The ITS unit 20 may then compute Rt(i,j,k) if needed for each $k^{th}$ server 16. The ITS unit 20 then relays Rt(i,j) values to one or more inbound traffic limiters (ITL) 22.

(c) The ITL 22 admits inbound traffic 14 at the rate Rt(i,j) in each service cycle time.

The inbound traffic dispatching network 12 has an inbound traffic monitor (ITM) 24 that observes the admitted traffic rates Ra(i,j) and the rejected traffic rates Rr(i,j), and relays these rates to the ITS unit 20. Within the inbound traffic dispatching network 12, there could be more than one inbound traffic limiter (ITL) 22 and more than one inbound traffic monitor (ITM) 24. Although the inbound traffic monitor (ITM) 24 and inbound traffic limiter (ITL) 22 functions are shown and described as being associated with the inbound traffic dispatching network 12, these functions could be completely distributed to each individual server 16, as will be discussed below. Since the ITL 22 regulates the inbound traffic, it is convenient to put the inbound traffic monitoring functions at the ITL 22.

As also shown in FIG. 2, each server 16 may have a resource usage monitor (RUM) 26 that observes server resource usage, c(i,j), and an outbound traffic monitor (OTM) 28 that observes the outbound traffic, B(i,j), both of which are relayed to the ITS unit 20. There are a number of ways to observe the outbound traffic 18, B(i,j), and any of which would be suitable for purposes of the present invention. The ITS unit 20 collects Ra(i,j), Rr(i,j), B(i,j) and optionally Rbound(i,j) and c(i,j), and then computes the optimum values for Rt(i,j) that meet the service level agreements (SLAs) and relays these values to one or more ITLs 22. As represented in FIG. 2, a server resource manager 21 is an optional means and its responsibility is to provide the absolute bound Rbound (i,j) on the rate Rt(i,j) regardless of the Bmax(i,j) given in the (min,max) SLAs.

Figure 3:
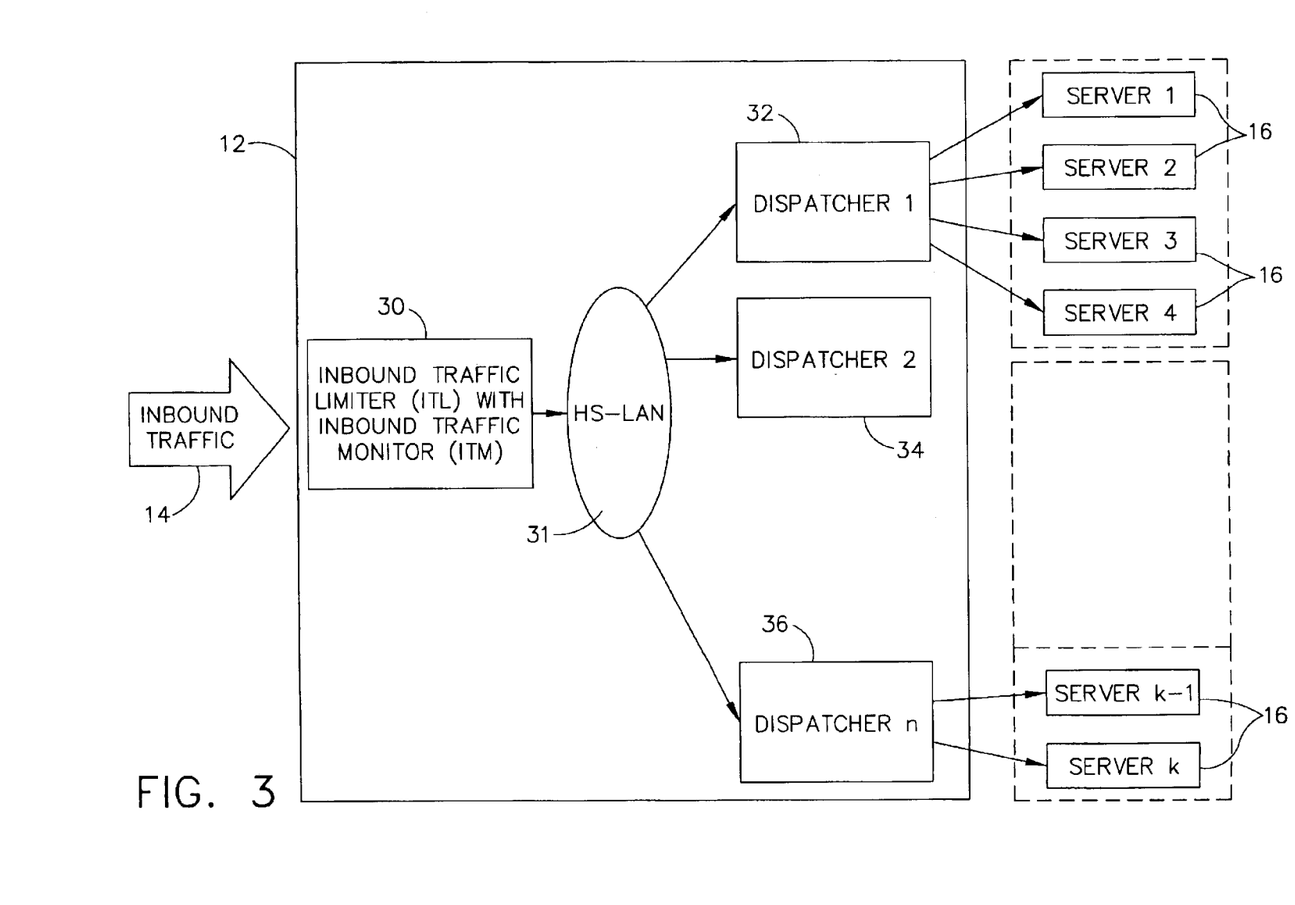
FIGS. 3 and 4 schematically represent two embodiments for an inbound traffic dispatching network represented in FIG. 2.
Figure 4:
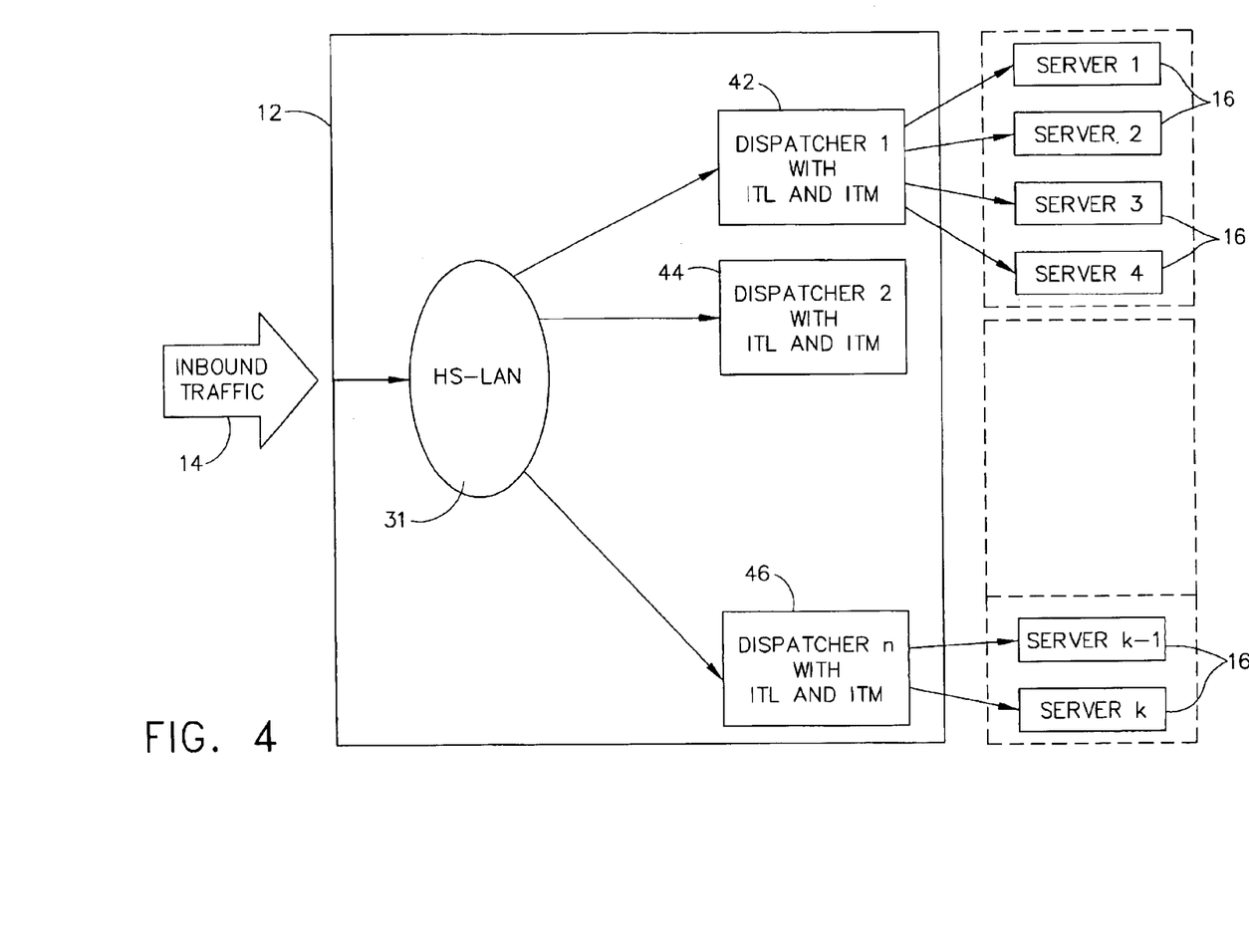

FIGS. 3 and 4 schematically represent how the inbound traffic dispatching network 12 can be rendered highly scalable (large capacity) using existing dispatchers and a high-speed LAN (HS-LAN). In FIG. 3, the inbound traffic limiting function and the inbound traffic monitoring function of the ITL 22 and ITM 24, respectively, are assigned to a standalone ITL unit 30, while in FIG. 4 the inbound traffic limiting function and the inbound traffic monitoring function are assigned to each of a number of dispatchers 42, 44 and 46. With reference to FIG. 3, the ITL unit 30 is connected to dispatchers 32, 34 and 36 via a high-speed LAN (HS-LAN) 31. The primary responsibility of the ITL unit 30 is to limit (thus dropping when needed) the inbound traffic (i,j) 14 by applying the target rates Rt(i,j) given by the ITS unit 20. While doing so, ITL unit 30 also monitors both admitted traffic Ra(i,j) and rejected traffic Rr(i,j). Each dispatcher 32, 34 and 36 is responsible for dispatching (or load balancing) received traffic to associated servers 16 using any of its own load balancing algorithms. The traffic admittance algorithm used by the ITL 22 associated with the unit 30 for rate-based admittance is referred to as the rate-based inbound traffic regulation algorithm. While only one ITL unit 30 is represented in FIG. 3, additional ITLs can be added to the high-speed LAN (HS-LAN) 31 to achieve even higher capacity, thus achieving higher scalability.

The inbound traffic dispatching network 12 of FIG. 4 is structured similarly to that of FIG. 3, with a difference being that the inbound traffic limiting function and the inbound traffic monitoring function are assigned to each dispatcher 42, 44 and 46. Inbound traffic 14 are sent to dispatchers 42, 44 and 46 via a high-speed LAN (HS-LAN) 31. The dispatchers 42, 44 and 46 with the ITL functionality are responsible for regulating the inbound traffic 14 prior to dispatching traffic to the servers 16. In this embodiment, both ITL and ITM functionalities become the added functionalities to any existing dispatcher (or load balancing) units.

Figure 5:
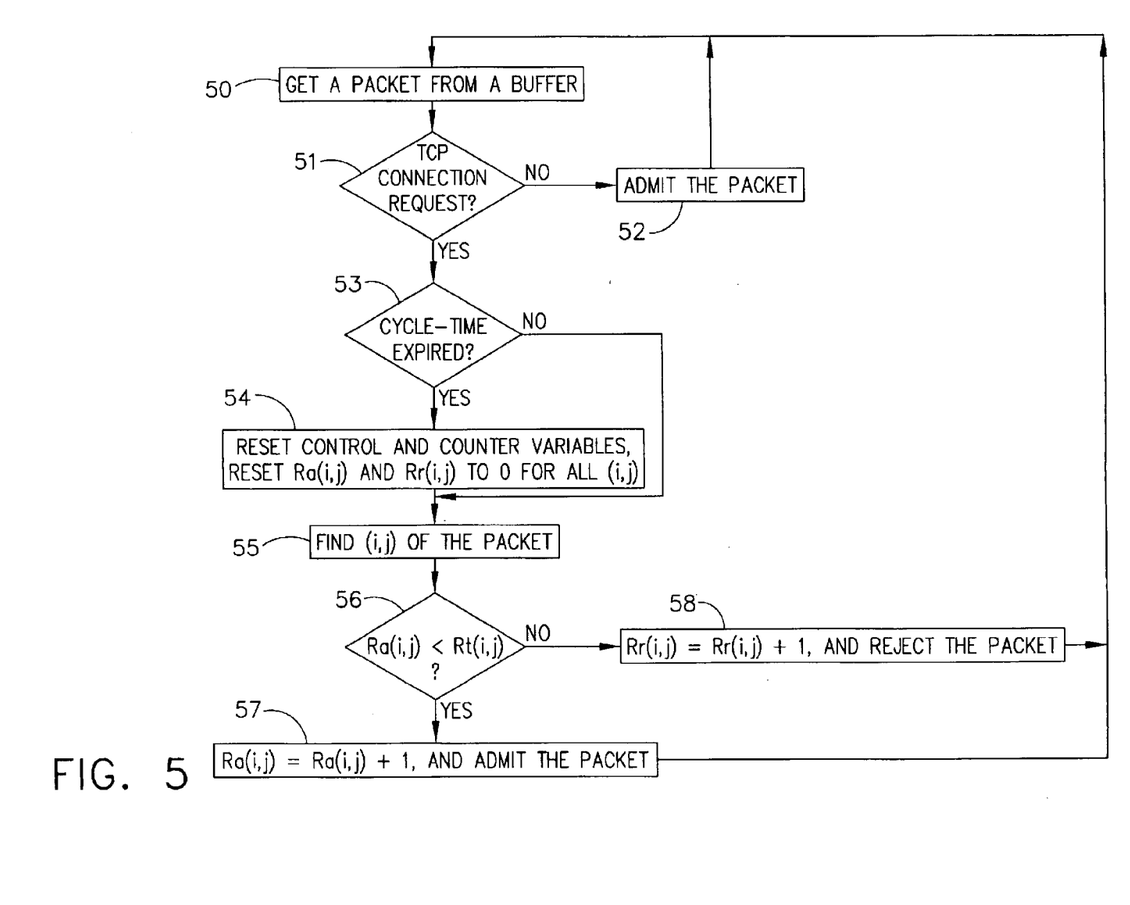
FIG. 5 schematically represents an inbound traffic limiter algorithm for use with inbound traffic limiters of FIGS. 2 through 4 and 7.

FIG. 5 schematically represents the rate-based inbound traffic regulation algorithm executed by each ITL 22. This algorithm is repeated with each service cycle. Step 53 checks if the cycle-time has expired or not. If not expired, the algorithm moves to step 55. When the cycle-time has expired, the algorithm executes step 54, gets a new set of Rt(i,j) values if available, resets any other control and counter variables, and resets both Ra(i,j) and Rr(i,j) to zero for all i and j. Step 55 determines to which customer and traffic type (i,j) the received TCP connection request packet in step 50 belongs to so that a proper rate Rt(i,j) can be applied. In step 56, the algorithm checks whether or not the received TCP connection request packet of type (i,j) can be admitted by comparing Ra(i,j) against Rt(i,j). In step 56, if Ra(i,j) is less than Rt(i,j), the received TCP connection request packet is admitted by executing step 57. Step 57 increments Ra(i,j) by one and admits the packet. In step 56, if Ra(i,j) has reached Rt(i,j), step 58 is executed. Step 58 increments Rr(i,j) by one and rejects (or drops) the received TCP connection request packet. Both step 57 and 58 lead to step 50. Step 50 gets a packet from inbound traffic 14. Step 51 checks whether or not the received packet is a TCP connection request. If not, the packet is simply admitted. If yes, step 53 is executed.

Figure 6A:
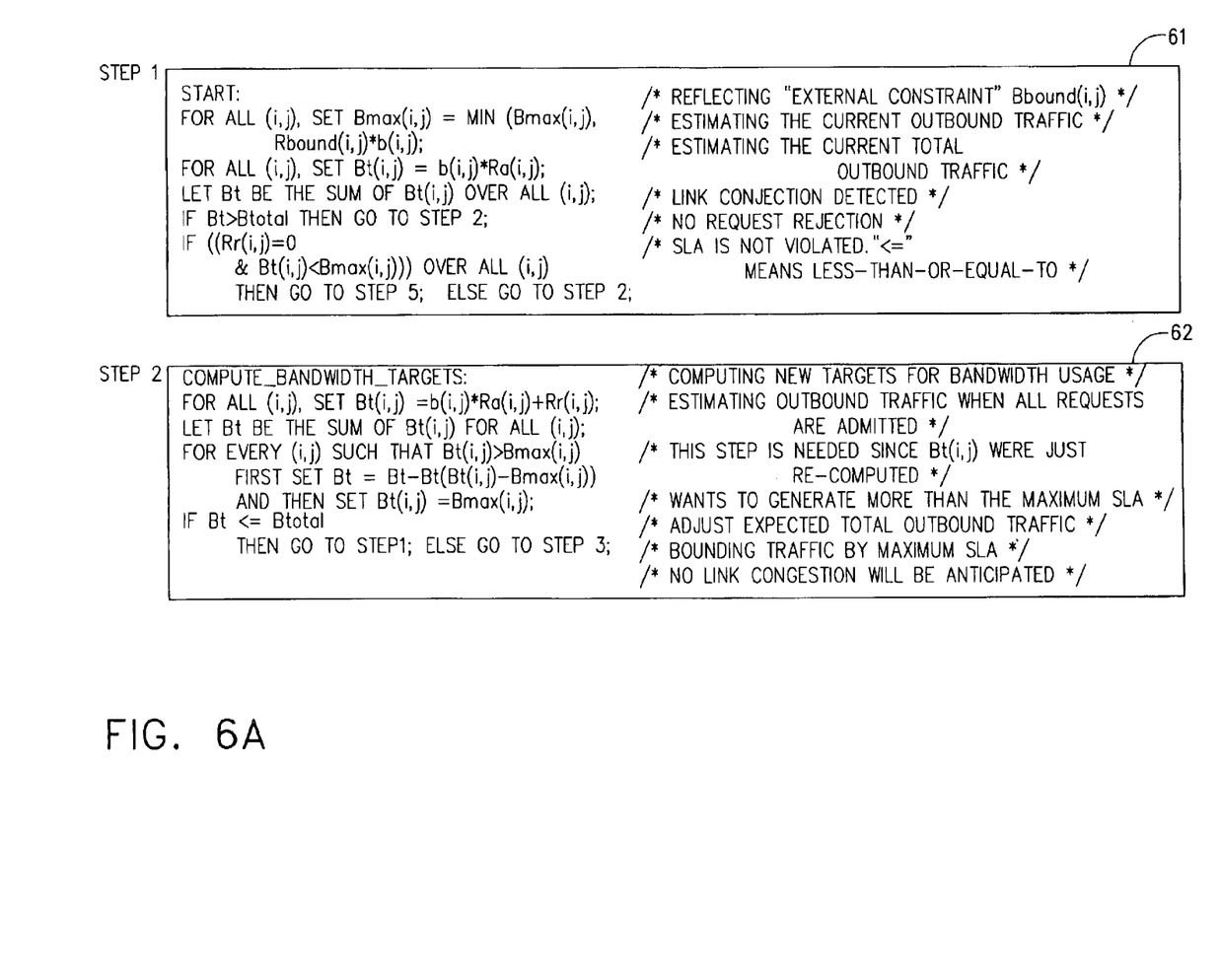
FIG. 6 schematically represents a rate scheduling algorithm for computing $Rt(i,j)$ with an inbound traffic scheduler unit represented in FIG. 2.
Figure 6B:
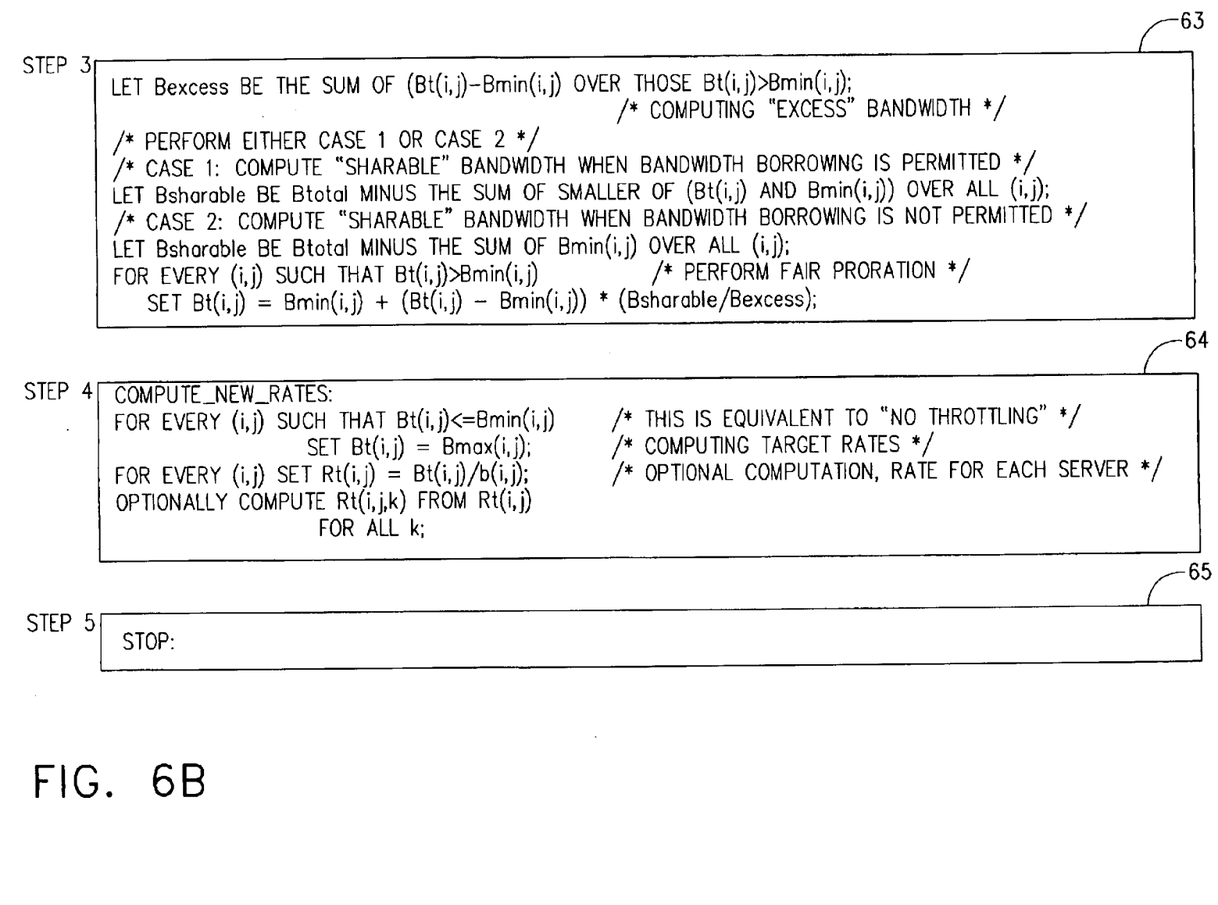

FIG. 6 schematically represents an algorithm referred to above as the rate scheduling algorithm, which is executed by the ITS unit 20 to determine the optimum values for Rt(i,j) for all i and j. This scheduling algorithm starts at step 1 (61), which examines whether or not the service level agreements (SLAs) are all satisfied. Step 1 computes b(i,j) using the formula:

$$b(i,j)=a(B(i,j)/Ra(i,j))+(1-a)\ b(i,j)$$

where b(i,j) is the expected bandwidth usage per unit of inbound traffic 14, Ra(i,j) is the admitted inbound traffic, B(i,j) is the observed $i^{th}$ customer's $j^{th}$ type traffic total, and a is a value between 0 and 1.

Step 1 adjusts Bmax(i,j) by choosing the minimum of Bmax(i,j) itself and an optionally given bound Rbound(i,j) *b(i,j). Here Rbound(i,j) is an "absolute bound" on Rt(i,j). Since Bmin(i,j) must be less than or equal to Bmax(i,j), this adjustment may affect to the value of Bmin(i,j) as well. Step 1 then computes Bt(i,j) and Bt and checks whether or not the generated outbound traffic is currently exceeding the total usable bandwidth Btotal (that is detecting the outbound link congestion). If the congestion on the outbound link has been detected, step 2 (62) is executed. If there was no congestion detected and no packet dropping (Rr(i,j)=0) and no SLA has been violated, the algorithm moves to step 5 (65) and stops. Otherwise, step 1 moves to step 2 (62).

Step 2 (62) first computes the bandwidth requirement Bt(i,j) had no packets been dropped, that is the total inbound traffic (Ra(i,j)+Rr(i,j)) for all (i,j) had been admitted. This bandwidth requirement Bt(i,j) could not exceed Bmax(i,j) and thus it is bounded by Bmax(i,j). Step 2 then checks if the bandwidth requirements Bt(i,j) for all (i,j) can be supported without congesting the outbound link. If so, step 2 moves to step 4 (64) to convert the targeted bandwidth requirement to the targeted rates. If step 2 detects a possible congestion (Bt>Btotal), it then moves to step 3 (63) to adjust those Bt(i,j) computed in step 2 (62) so that the link level congestion could be avoided while guaranteeing the minimum bandwidth Bmin(i,j) for every (i,j).

In step 3, two options are described: a first allows "bandwidth borrowing" among customers, while in the second "bandwidth borrowing" among customers are not allowed. Here, "bandwidth borrowing" means letting some customers use the portion of the minimum guaranteed bandwidth not used by other customers. Step 3 first computes the "shareable" bandwidth. Step 3 then allocates (or prorates) the shareable bandwidth among those customer traffic classes that are demanding more than the guaranteed bandwidth Bmin(i,j). Although step 3 describes the use of "fair prorating of shareable bandwidth", this allocation discipline can be replaced by any other allocation discipline such as "weighted priority" or "weighted cost".

In step 4 (64), the bandwidth use targets Bt(i,j) computed in step 3 are converted to the target inbound traffic rates Rt(i,j). When Bt(i,j) is less than or equal to the guaranteed minimum Bmin(i,j), there should be no "throttling" of the inbound traffic. Therefore, Bt(i,j) is set to Bmax(i,j) for such (i,j) prior to converting Bt(i,j) to Rt(i,j). In step 4, if the target rates are used by servers (as will be described later in FIG. 7), Rt(i,j,k) must be computed from Rt(i,j) to balance the response time given by various servers 16 for each pair of (i,j) among all k. Doing so is equivalent to making the residual capacity or resource of all servers 16 equal, expressed by:

$$C(i,j,1)-Rt(i,j,1)c(i,j)=C(i,j,2)-Rt(i,j,2)c(i,j)=\ldots C(i,j,n)-Rt(i,j,n)c(i,j)=d$$

where C(i,j,k) is the total resource allocated at server k for handling the traffic class (i,j), c(i,j) is the expected resource usage by a unit of (i,j) traffic and d is a derived value. Since $$Rt(i,j)=\text{SUM of } Rt(i,j,k) \text{ for all } k=\text{SUM of}(C(i,j,k)-d)/c((i,j) \text{ for all } k$$

one can derive d from the above formula. Assuming a total of n servers:

$$d=(C(i,j)-Rt(i,j)c(i,j))/n$$

where C(i,j) is the sum of C(i,j,k) over all k, and the formula for deriving Rt(i,j,k) from Rt(i,j) is $$Rt(i,j,k)=(C(i,j,k)-(C(i,j)-Rt(i,j)c(i,j))/n)/c(i,j)$$

Step 4 (64) leads to step 5 (65) and the rate scheduling algorithm stops.

Figure 7:
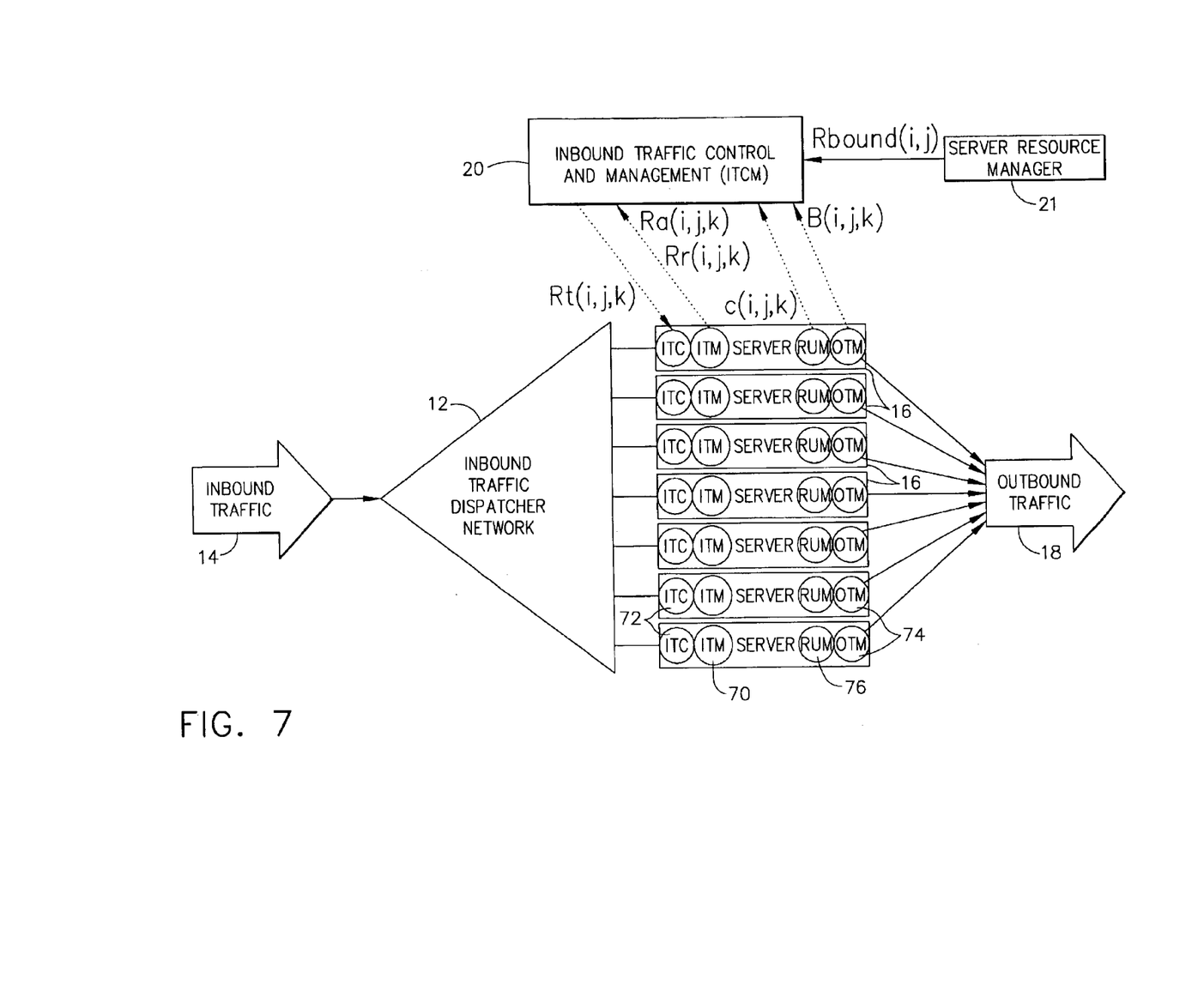
FIG. 7 represents an inbound traffic limiting system operating within each server in accordance with another embodiment of the present invention.

Finally, FIG. 7 represents a system in which the inbound traffic monitoring function (ITM) 70, inbound traffic limiting function (ITL) 72 and outbound traffic monitoring function (OTM) 74 are distributed to each server 16. Also distributed to each server 16 is resource use monitoring function (RUM) 76. This system makes the inbound traffic dispatching network 12 in FIG. 7 extremely simple. The inbound traffic dispatching network 12 of FIG. 7 is very much like the one illustrated in FIG. 4 except the dispatchers 42, 44 and 46 are simply replaced by dispatchers 32, 34 and 36. In this case, the ITS 20 executes the rate scheduling algorithm and derives Rt(i,j,k) from Rt(i,j) for every k. As in the case of the ITS 20 in FIG. 2, the ITS 20 in FIG. 7 gets Rbound(i,j) from any server resource manager 21. The ITS 20 uses c(i,j), the average of c(i,j,k) over k, in the derivation of Rt(i,j,k) from Rt(i,j). c(i,j,k) are observed by the resource utilization monitoring function (RUM) 76 that resides in each server 16. Furthermore, each ITL 72 executes the rate-based inbound traffic regulation algorithm for (i,j,k) in place of (i,j) described in reference to FIG. 5. The ITS 20 relays Rt(i,j,k) values to each server k.

While the invention has been described in terms of a preferred embodiment, it is apparent that other forms could be adopted by one skilled in the art. Accordingly, the scope of the invention is to be limited only by the following claims.

What is claimed is:

1. A system for controlling and managing Internet server farm traffic through a plurality of servers, the server farm traffic arriving at a server farm as inbound traffic organized by customer (i) and traffic type (j) and leaving the server farm as outbound traffic, the system being operable to control and manage the outbound traffic in accordance with outbound bandwidth usage-based service level agreements of form (Bmin,Bmax) by computing a target rate (Rt) for each customer traffic type (i,j) that supports the outbound bandwidth usage-based service level agreements of form (Bmin,Bmax) and then admitting a portion of the inbound traffic at an admitted rate (Ra) while rejecting at a rejected rate (Rr) a remaining portion of the inbound traffic that if processed would cause the outbound traffic for the customer traffic tape (i,j) to exceed the target rate (Rt), the system comprising:

means for collecting the admitted rate (Ra) of inbound traffic for each customer traffic type (i,j);

means for collecting the rejected rate (Rr) of inbound traffic for each customer traffic type (i,j);

means for collecting the outbound traffic (B) for each customer traffic type (i,j);

means for computing an expected bandwidth usage (b) per TCP connection request for each customer traffic type (i,j);

means for using the expected bandwidth usage (b) to compute the target rate (Rt) for each customer traffic type (i,j) that supports the outbound bandwidth usage-based service level agreements of form (Bmin,Bmax);

limiter means for admitting inbound traffic based on the target rate (Rt), for rejecting inbound traffic that exceeds the target rate (Rt), and for tracking the volume of admitted inbound traffic (Ra) and the volume of rejected inbound traffic (Rr) for each customer traffic type (i,j);

means for relaying the target rates (Rt) for inbound traffic to the limiter means; and means for dispatching the admitted inbound traffic (Ra) to the servers.

2. A system according to claim 1, wherein the means for collecting the admitted rate (Ra) and the rejected rate (Rr) of inbound traffic comprises an inbound traffic scheduler device and an inbound traffic monitor, the inbound traffic monitor being operable to observe the admitted rate (Ra) and the rejected rate (Rr) of inbound traffic and relay the admitted rate (Ra) and rejected rate (Rr) to the inbound traffic scheduler device.

3. A system according to claim 2, wherein the inbound traffic monitor is associated with the dispatching means.

4. A system according to claim 1, wherein the means for collecting the admitted rate (Ra) and the rejected rate (Rr) of inbound traffic comprises an inbound traffic scheduler device and the limiter means, the limiter means being operable to observe and relay the amount of admitted inbound traffic (Rp) and the amount of rejected traffic (Rr) to the inbound traffic scheduler device.

5. A system according to claim 4, wherein the limiter means is associated with the dispatching means.

6. A system according to claim 1, wherein the means for collecting the outbound traffic (B) comprises an inbound traffic scheduler device and an outbound traffic monitor, the outbound traffic monitor being operable to observe and relay the amount of outbound traffic (B) to the inbound traffic scheduler device.

7. A system according to claim 6, wherein the outbound traffic monitor is associated with the servers.

8. A system according to claim 1, further comprising means for observing the average resource usage (c) of each server consumed for each consumer traffic type (i,j).

9. A system according to claim 8, wherein the means for observing the average resource usage (c) is associated with the servers.

10. A system according to claim 1, further comprising means for dispatching the inbound traffic among the servers.

11. A system according to claim 1, wherein the dispatching means comprises at least one inbound traffic limiter, a high-speed LAN and a plurality of dispatchers, the limiter means being associated with the inbound traffic limiter, each of the dispatchers being associated with at least one of the servers.

12. A system according to claim 1, wherein the dispatching means comprises a high-speed LAN and a plurality of dispatchers, the limiter means and monitor means being associated with each of the dispatchers, each of the dispatchers being associated with at least one of the servers.

13. A system according to claim 1, further comprising means for establishing an absolute bound (Rbound) of the target rate (Rt) for each customer traffic type (i,j).

14. A system according to claim 13, further comprising means for collecting the absolute bound (Rbound) of the target rate (Rt) for each customer traffic type (i,j).

15. A system according to claim 14, further comprising means for limiting the target rate (Rt) for inbound traffic when Rbound is available from the establishing means.

16. A system for controlling and managing Internet server farm traffic through a plurality of servers, the server farm traffic arriving at a server farm as inbound traffic organized by customer (I) and traffic type (j) and leaving the server farm as outbound traffic, the system being operable to control and manage the outbound traffic in accordance with outbound bandwidth usage-based service level agreements of form (Bmin,Bmax) by computing a target rate (Rt) for each customer traffic type (i,j) that supports the outbound bandwidth usage-based service level agreements of form (Bmin,Bmax) and then admitting a portion of the inbound traffic at an admitted rate (Ra) while rejecting at a rejected rate (Rr) a remaining portion of the inbound traffic that if processed would cause the outbound traffic for the customer traffic type (i,j) to exceed the target rate (Rt), the system being further operable to control and manage the outbound traffic in accordance with a server resource manager that establishes an absolute bound (Rbound) of a target rate (Rt) for each customer traffic type (i,j), the system comprising:

an inbound traffic scheduler device operable to collect the admitted rate (Ra) and the rejected rata (Rr) of inbound traffic for each customer traffic type (i,j), collect the bound (Rbound) from any server resource manager and collect the outbound traffic (B) for each customer traffic type (i,j), the inbound traffic scheduler device being further operable to compute an expected bandwidth usage (b) per request for each customer traffic type (i,j) and use the expected bandwidth usage (b) to compute a target rate (Rt) for inbound traffic for each customer traffic type (i,j) to support the outbound bandwidth usage-based service level agreements of form (Bmin, Bmax);

an inbound traffic limiter operable to receive the target rate (Rt) from the inbound traffic scheduler device, admit inbound traffic based on the target rate (Rt), track the volume of admitted inbound traffic (Ra) and the volume of rejected inbound traffic (Rr) for each customer traffic type (i,j), and relay the amount of admitted inbound traffic (Ra) and the amount of rejected traffic (Rr) to the inbound traffic scheduler device; and an inbound traffic dispatching network operable to classify incoming traffic, the inbound traffic dispatching network being controlled by the inbound traffic limiter to selectively dropping packets arriving in the inbound traffic limiter if the inbound traffic exceeds the target rate (Rt), the inbound traffic dispatching network further being comprised of a high-speed LAN with dispatchers to dispatch the admitted inbound traffic (Ra) to the servers.

17. A system according to claim 16, wherein the inbound traffic scheduler is operable to compute target rates (Rt) for all customer traffic type (i,j) to meet with the service level agreements of form (Bmin,Bmax) on the outbound bandwidth usage, and is operable to support both bandwidth borrowing and bandwidth not-borrowing modes of operations.

18. A system according to claim 16, wherein the inbound traffic limiter is associated with the inbound traffic dispatching network.

19. A system according to claim 16, further comprising an inbound traffic monitor associated with the inbound traffic dispatching network, the inbound traffic monitor being operable to observe the admitted rate (Ra) and the rejected rata (Rr) of inbound traffic and relay the admitted rate (Ra) and the rejected rate (Rr) to the inbound traffic scheduler device.

20. A system according to claim 16, further comprising an outbound traffic monitor that is operable to observe and relay the amount of outbound traffic (B) to the inbound traffic scheduler device.

21. A system according to claim 16, further comprising a resource usage monitor that is operable to observe and relay the average resource usage (c) of each server consumed for each consumer traffic type (i,j) to the inbound traffic scheduler device.

22. A system according to claim 16, wherein the inbound traffic dispatching network is operable to balance the inbound traffic among the servers.

23. A system according to claim 16, wherein the inbound traffic dispatching network comprises at least one inbound traffic limiter, a high-speed LAN and a plurality of dispatchers, each of the dispatchers being associated with at least one of the servers.

24. A system according to claim 16, wherein the inbound traffic dispatching network comprises a high-speed LAN and a plurality of dispatchers, the inbound traffic limiter and inbound traffic monitor being associated with each of the dispatchers, each of the dispatchers being associated with at least one of the servers.

25. A method for controlling and managing Internet server farm traffic through a plurality of servers, the server farm traffic arriving at a server farm as inbound traffic organized by customer (I) and traffic type (j) and leaving the server farm as outbound traffic that is controlled and managed in accordance with outbound bandwidth usage-based service level agreements (Bmin(i,j),Bmax(i,j)) by computing a target rate (Rt) for each customer traffic type (i,j) that supports the outbound bandwidth usage-based service level agreements of form (Bmin(i,j),Bmax(i,j) and then admitting a portion of the inbound traffic at an admitted rate (Ra) while rejecting at a rejected rate (Rr) a remaining portion of the inbound traffic that if processed would cause the outbound traffic for the customer traffic type (i,j) to exceed the target rate (Rt), the method comprising the steps of:

collecting the admitted rate (Ra(i,j)) of inbound traffic for each customer traffic type (i,j);

collecting the rejected rate (Rr(i,j)) of inbound traffic for each customer traffic type (i,j);

collecting the outbound traffic (B(i,j)) for each customer traffic type (i,j);

collecting the absolute bound (Rbound(i,j)) on the target rate (Rt(i,j)) for each customer traffic type (i,j);

computing an expected bandwidth usage (b(i,j)) per TCP connection request for each customer traffic type (i,j);

using the expected bandwidth usage (b(i,j)) to compute the target rate (Rt(i,j)) for each customer traffic type (i,j) based on the admitted rate (Ra(i,j)), the rejected rate (Rr(i,j)), the outbound traffic (B(i,j)), the expected bandwidth usage (b(i,j)) and the outbound bandwidth usage-based service level agreements (Bmin(i,j),Bmax (i,j));

admitting inbound traffic based on the target rate (Rt(i,j)), rejecting inbound traffic that exceeds the target rate (Rt(i,j)) and tracking the volume of admitted inbound traffic (Ra(i,j)) and the volume of rejected inbound traffic (Rr(i,j)) for each customer traffic type (i,j);

relaying the target rates (Rt(i,j)) for inbound traffic to the limiter means; and dispatching the admitted inbound traffic (Rp(i,j)) to the servers.

26. A method according to claim 25, wherein the step of collecting the admitted rate (Ra(i,j)) and the rejected rate (Rr(i,j)) of inbound traffic comprises the steps of observing the admitted rate (Ra(i,j)) and the rejected rate (Rr(i,j)) of inbound traffic with an inbound traffic monitor and then relaying the admitted rate (Ra(i,j)) and the rejected rate (Rr(i,j)) to an inbound traffic scheduler device that performs the steps of computing the expected bandwidth usage (b(i,j)) and the target rate (Ra(i,j)) to support the outbound bandwidth usage-based service level agreements (Bmin(i,j), Bmax(i,j)).

27. A method according to claim 25, wherein the step of collecting the admitted rate (Ra(i,j)) and the rejected rate (Rr(i,j)) of inbound traffic comprises the steps of observing the amount of admitted inbound traffic (Ra(i,j)) and the amount of rejected traffic (Rr(i,j)) with an inbound traffic limiter and then relaying the admitted rate (Ra(i,j)) and the rejected rate (Rr(i,j)) to an inbound traffic scheduler device that performs the steps of computing the expected bandwidth usage (b(i,j)) and the target rate (Rt(i,j)) to support the outbound bandwidth usage-based service level agreements (Bmin(i,j),Bmax(i,j).

28. A method according to claim 25, wherein the step of collecting the bound (Rbound(i,j)) on the target rate (Rt(i,j)) comprises the steps of receiving the bound (Rbound(i,j)) from a server resource manager.

29. A method according to claim 25, wherein the step of collecting the outbound traffic (B(i,j)) comprises the steps of observing the amount of outbound traffic (B(i,j)) with an outbound traffic monitor and then relaying the amount of outbound traffic (B(i,j)) to a device that performs the steps of computing the expected bandwidth usage (b(i,j)) and the target rate (Rt(i,j)) to support the outbound bandwidth usage-based service level agreements (Bmin(i,j),Bmax(i,j)).

30. A method according to claim 25, further comprising the step of observing the average resource usage (c(i,j)) of each server consumed for each consumer traffic type (i,j).

31. A method according to claim 25, further comprising the step of balancing the inbound traffic among the servers.

32. A method according to claim 25, further comprising the step of limiting the target rate (Rt(i,j)) for inbound traffic independently of the service level agreement (Bmin(i,j), Bmax(i,j)).

33. A method according to claim 25, further comprising the step of classifying incoming traffic and selectively dropping packets prior to admitting and dispatching the packets to the servers.

* * * * *